(12) United States Patent  
Jinno et al.

(10) Patent No.: US 7,967,028 B2
(45) Date of Patent: Jun. 28, 2011

(54) VALVE ASSEMBLY

(75) Inventors: Tomoya Jinno, Anjo (JP); Tetsuya Shimizu, Anjo (JP); Kenichi Tsuchida, Anjo (JP); Masamichi Yamaguchi, Anjo (JP); Satoshi Nishio, Hekinan (JP); Akitomo Suzuki, Anjo (JP); Kazunori Ishikawa, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 445 days.

(21) Appl. No.: 12/292,326

(22) Filed: Nov. 17, 2008

(65) Prior Publication Data

US 2009/0140190 A1 Jun. 4, 2009

(30) Foreign Application Priority Data

Nov. 30, 2007 (JP) ................................. 2007-310084

(51) Int. Cl.  
*F16K 11/10* (2006.01)
(52) U.S. Cl. ........................................................ 137/884
(58) Field of Classification Search ............. 137/625.65, 137/625.69, 884  
See application file for complete search history.

(56) References Cited

U.S. PATENT DOCUMENTS

| 3,556,147 | A | * | 1/1971 | Sizer et al. | ........................ | 137/884 |
| 3,951,167 | A | * | 4/1976 | Howell et al. | ..................... | 137/884 |
| 6,840,265 | B2 | * | 1/2005 | Wojciechowski | ........ | 137/315.03 |
| 2003/0027673 | A1 | | 2/2003 | Suzuki et al. | | |

FOREIGN PATENT DOCUMENTS

| JP | A-05-203077 | 8/1993 |
| JP | A-08-121631 | 5/1996 |
| JP | A-2001-141009 | 5/2001 |
| JP | A-2003-49802 | 2/2003 |
| JP | A-2007-120713 | 5/2007 |
| JP | A-2007-187292 | 7/2007 |

* cited by examiner

*Primary Examiner* — John Fox  
(74) *Attorney, Agent, or Firm* — Oliff & Berridge, PLC

(57) ABSTRACT

A valve assembly includes a plurality of solenoid valves, each solenoid valve having a pressure-regulating valve portion formed by a sleeve having a plurality of valve-side ports and a spool for opening and closing the valve-side ports, and a solenoid portion having a plunger for driving the spool and a coil for electromagnetically driving the plunger; and a valve body having a plurality of insertion holes into which the solenoid valves are inserted, and having ports that are connected to the plurality of valve-side ports in a state in which the solenoid valves are mounted.

11 Claims, 9 Drawing Sheets

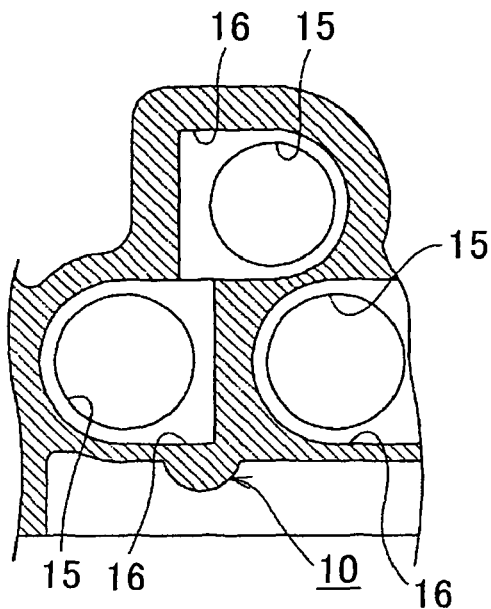
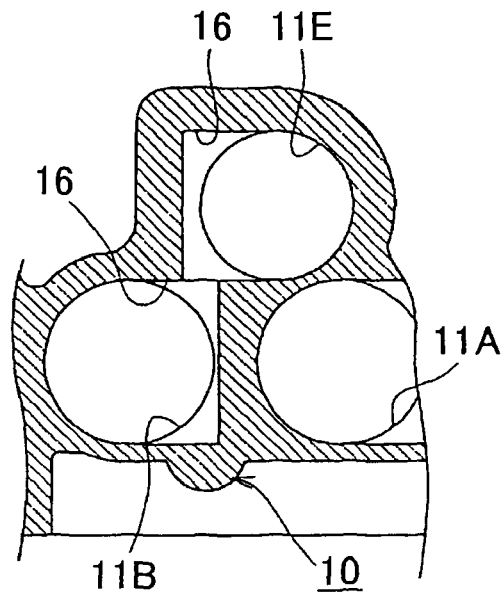
FIG. 3A
FIG. 3B
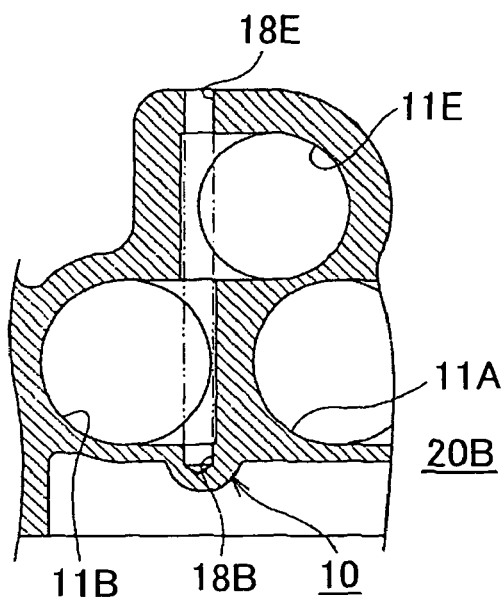
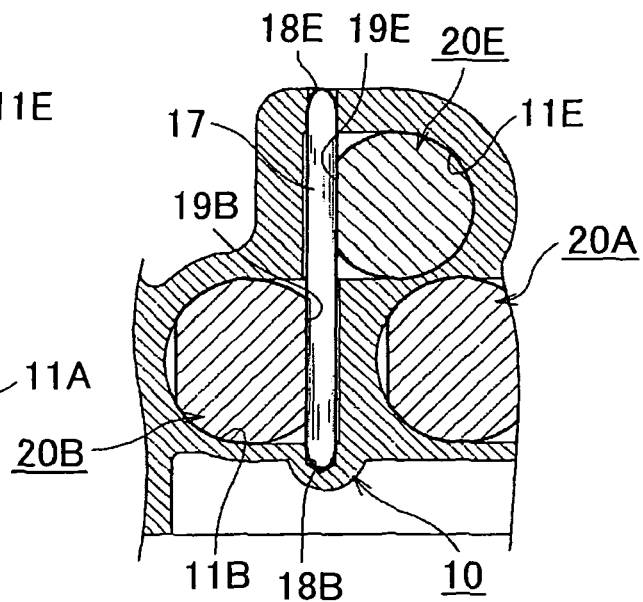
FIG. 3C
FIG. 3D

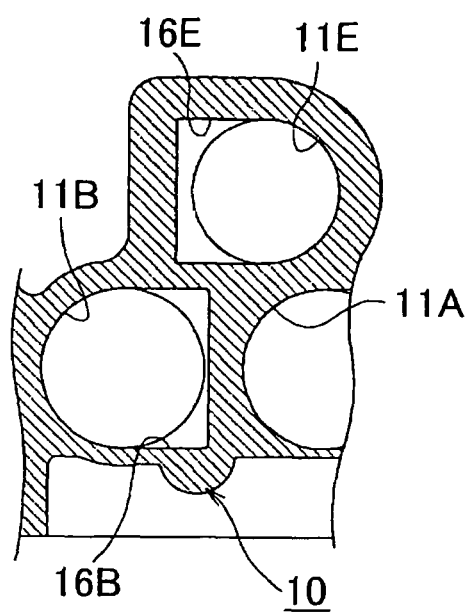
F I G. 4A
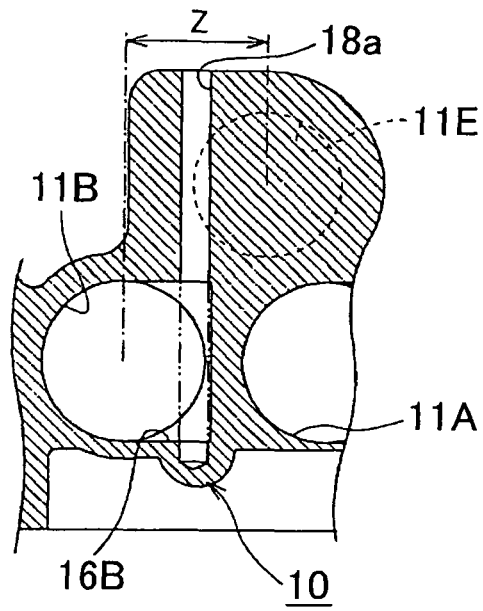
F I G. 4B
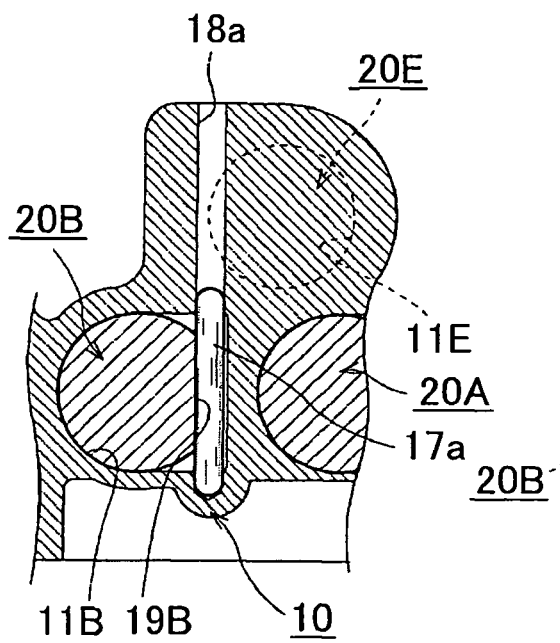
F I G. 4C
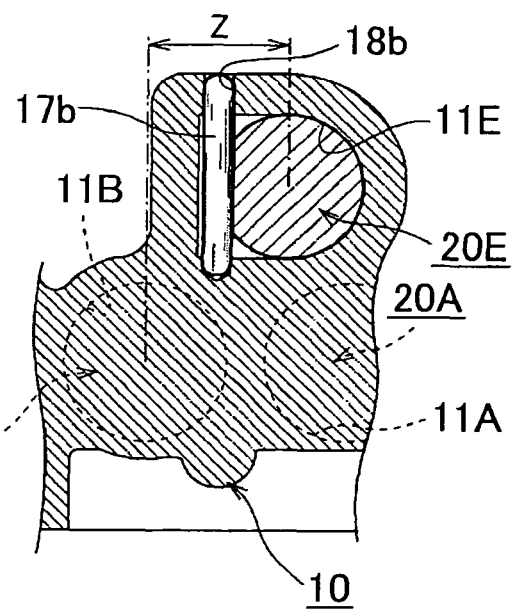
F I G. 4D

VALVE ASSEMBLY

INCORPORATION BY REFERENCE

The disclosure of Japanese Patent Application No. 2007-310084 filed on Nov. 30, 2007 including the specification, drawings and abstract is incorporated herein by reference in its entirety.

BACKGROUND OF THE INVENTION

The present invention relates to a valve assembly.

There exists a linear solenoid valve as shown in FIG. 2 of Japanese Patent Application Publication No. JP-A-2007-120713, for example, that is fixed by inserting a core stator (35) (note that the numerals in parentheses indicate constituent elements shown in the figures of JP-A-2007-120713) having an end provided with a cylindrical boss portion (42) into a fitting hole formed at a cylinder end of a valve body (4A), and driving an assembly pin (54) therein. More specifically, a fitting surface is provided on the cylindrical boss portion (42) of the core stator (35) and a mating fitting hole is provided at the other end of the valve body (4A), which forms a loose fitting. A small through hole (53) is formed at least at two positions in a direction perpendicular to an axis so as to be in contact with this fitting portion. The assembly pin (54) is driven into the through holes (53), whereby the linear solenoid valve is fixed with a predetermined axial force generated in an axial direction. When the linear solenoid valve is fixed by driving the assembly pin (54), at least a semicircular center of the through hole (53) of the cylindrical boss portion (42) and a semicircular center of the through hole (53) of the valve body (4A) are slightly offset from each other. Elastic deformation corresponding to the offset amount is generated by the assembly pin (54), whereby an appropriate axial force is generated, thereby enabling reliable fixing. The assembly pin (54) is not limited so as to be straight in a longitudinal axial direction, but the assembly pin (54) may be curved or may have a tapered structure. Alternatively, the linear solenoid valve may be fixed by an elastic force of the assembly pin (54) when the assembly pin (54) is driven.

According to the technology disclosed in Japanese Patent Application Publication No. JP-A-2007-187292, a groove of a linear solenoid valve for inserting the assembly pin therein is formed so that a groove width gradually increases to both sides in a groove width direction from a middle portion in a groove direction toward both ends of the groove. When the assembly pin is inserted, a groove width at a position where an axial centerline of the assembly pin crosses an outer peripheral surface of the valve body is larger than a groove width in the middle portion.

According to the technology disclosed in Japanese Patent Application Publication No. JP-A-2003-49802, a first slit formed on a side surface of a linear solenoid valve is used to insert an assembly pin in a direction perpendicular to an axial direction of the linear solenoid valve. The linear solenoid valve is rotated around an axial center so that a small diameter portion of the assembly pin faces an outer wall of a second slit. The linear solenoid valve is pressed against a specific side of a mounting hole by a biasing force of the assembly pin, whereby an actuator is fixed to a valve body. Since an axial opening width of the second slit is smaller than a diameter of a large diameter portion of the assembly pin, the assembly pin can be prevented from automatically slipping off.

SUMMARY

The linear solenoid valve described in Japanese Patent Application Publication No. JP-A-2007-120713 requires a large plane area depending on the arrangement state. An example is shown in FIGS. 8A and 8B.

FIG. 8A is a diagram illustrating a simple parallel arrangement of two linear solenoid valves, in which electromagnetically driven solenoid portions are positioned side by side in the same direction. FIG. 8B is a cross sectional view taken along line N-N in FIG. 8A, showing respective pressure-regulating valve portions of the linear solenoid valves.

In FIGS. 8A and 8B, in the case where a linear solenoid valve A and a linear solenoid valve B are simply arranged in parallel with each other in a valve body C, a pressure-regulating valve portion A2 of the linear solenoid valve A and a pressure regulating valve portion B2 of the linear solenoid valve B cannot be arranged close to each other due to a large size of the electromagnetically driven solenoid portions A1 and B1.

FIGS. 9A and 9B show an example in which the respective solenoid portions A1 and B1 of the linear solenoid valves are located at opposite positions to each other.

FIG. 9A is a diagram illustrating the case where electromagnetically driven coils are positioned in opposite directions to each other in order to efficiently arrange two linear solenoid valves with a small occupied volume. FIG. 9B is a cross-sectional view taken along line M-M of the pressure-regulating valve portions of the linear solenoid valves shown in FIG. 9A.

Referring to FIGS. 9A and 9B, in the case where the linear solenoid valve A and the linear solenoid valve B are efficiently arranged three-dimensionally in a valve body C so that the plane area and the occupied volume are minimized, the electromagnetically driven solenoid portions A1 and B1 are located at opposite positions to each other, and the pressure-regulating valve portion A2 of the linear solenoid valve A and the pressure-regulating valve portion B2 of the linear solenoid valve B can be arranged closer to each other. This structure enables a higher density arrangement.

Note that, according to the technology of Japanese Patent Application Publication No. JP-A-2007-187292, when the assembly pin is inserted, the groove width at the position where the centerline of the assembly pin crosses the outer peripheral surface of the housing is larger than the groove width in the middle portion. Although Japanese Patent Application Publication No. JP-A-2007-187292 discloses a groove for inserting the assembly pin therein, the disclosure does not lead to technology of how to arrange a plurality of linear solenoid valves three-dimensionally in order to reduce an occupied volume.

Moreover, according to the technology of Japanese Patent Application Publication No. JP-A-2003-49802, the first slit and the second slit are formed on the side surface of the linear solenoid valve in order to obtain an elastic force between the assembly pin and the linear solenoid valve by rotating the linear solenoid valve. The technology therefore cannot lead to technology of reducing an occupied volume of a valve body having a linear solenoid valve directly mounted thereon.

Especially in Japanese Patent Application Publication No. JP-A-2007-120713, in the case where the linear solenoid valve A and the linear solenoid valve B are efficiently arranged three-dimensionally so that the occupied volume is minimized, valve body-side ports connected to a plurality of valve-side ports need to be formed more three-dimensionally than in a known example. Moreover, even if the valve body-side ports are formed three-dimensionally by die casting technology, all the linear solenoid valves are removed to remove a specific linear solenoid valve if there is a need to replace the linear solenoid valve A or the linear solenoid valve B.

It is therefore not efficient in terms of maintenance or the like to release the attached state of all the linear solenoid valves to remove only a specific linear solenoid valve.

The present invention is made to solve the above problems, and it is an object of the present invention to provide a valve assembly capable of removing or attaching a given solenoid valve in a small unit, without removing all the linear solenoid valves attached to a valve body. The present invention can also achieve various other advantages.

According to an exemplary aspect of the invention, a valve assembly includes a plurality of solenoid valves, each solenoid valve having a pressure-regulating valve portion formed by a sleeve having a plurality of valve-side ports and a spool for opening and closing the valve-side ports, and a solenoid portion having a plunger for driving the spool and a coil for electromagnetically driving the plunger; and a valve body having a plurality of insertion holes into which the solenoid valves are inserted, and having ports that are connected to the plurality of valve-side ports in a state in which the solenoid valves are mounted. The solenoid valves are opposedly inserted into the insertion holes of the valve body such that diameters of adjacent solenoid portions at least partially overlap each other in a horizontal or up-down direction and adjacent sleeves are fixed to the valve body by an assembly pin that is inserted into a fixing hole formed in the valve body.

BRIEF DESCRIPTION OF THE DRAWINGS

Various exemplary aspects of the invention will be described with reference to the drawings, wherein:

FIG. 3A is a cross-sectional view corresponding to FIG. 2A taken along line X-X, showing the state right after die casting of the valve assembly according to a first modified example of the embodiment of the present invention; FIG. 3B is a cross-sectional view corresponding to FIG. 2B taken along X-X, showing the state after a diameter-increasing process is performed on the valve assembly according to the first modified example of the embodiment of the present invention; FIG. 3C is a cross-sectional view corresponding to FIG. 2C taken along line X-X, showing the state in which fixing holes are formed in the valve assembly according to the first modified example of the embodiment of the present invention; FIG. 3D is a cross-sectional view corresponding to FIG. 2D taken along line X-X, showing the state in which the valve assembly according to the first modified example of the embodiment of the present invention is fixed by an assembly pin;

FIG. 4A is a cross-sectional view corresponding to FIG. 2B, showing a valve assembly according to a second modified example of the embodiment of the present invention; FIG. 4B is a cross-sectional view corresponding to FIG. 2C, showing the valve assembly according to the second modified example of the embodiment of the present invention; FIG. 4C is a cross-sectional view showing a lower pin insertion position of an assembly pin in the valve assembly according to the second modified example of the embodiment of the present invention; FIG. 4D is a cross-sectional view showing an upper pin insertion position of an assembly pin in the valve assembly according to the second modified example of the embodiment of the present invention;

DETAILED DESCRIPTION OF EMBODIMENTS

Figure 1:
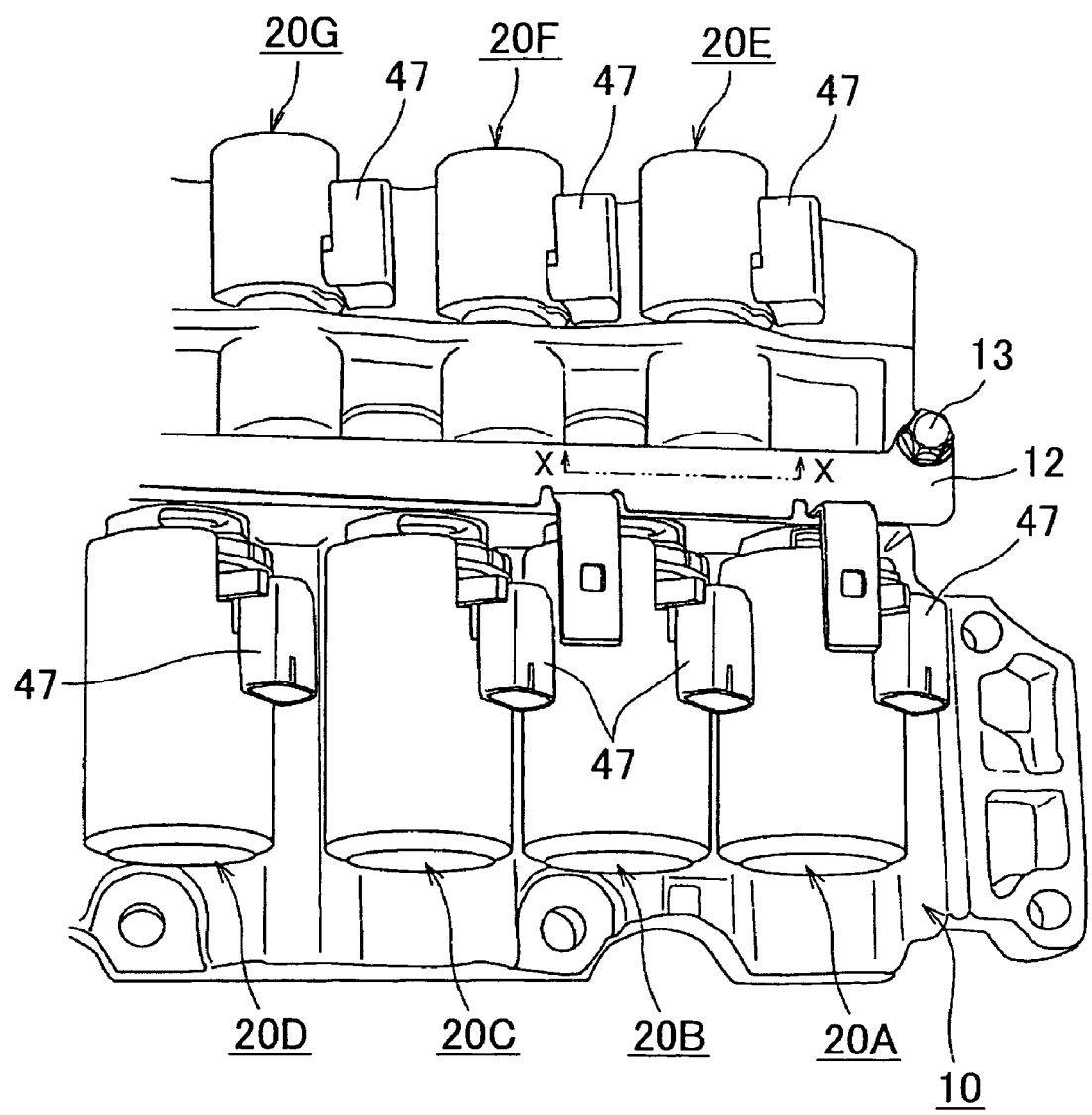
FIG. 1 is a perspective view showing an overall structure of a valve assembly according to an embodiment of the present invention.

Hereinafter, an embodiment of the present invention will be described with reference to the accompanying drawings. Note that, in the figures, the embodiment, and first and second modified examples thereof, like reference numerals and characters indicate like or corresponding functional portions, and any overlapping description will be omitted herein.

Figure 2A:
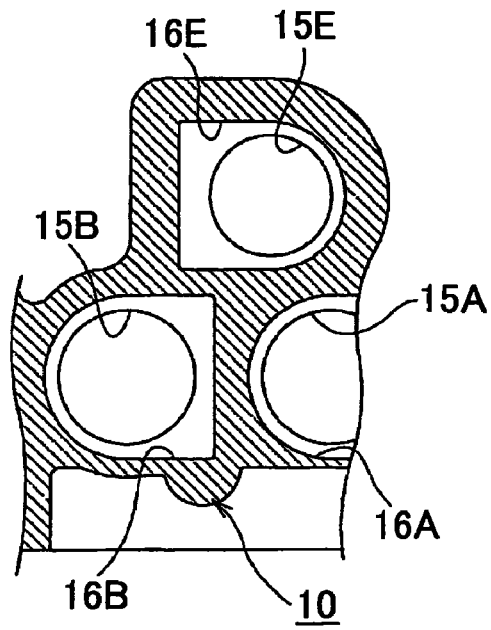
FIG. 2A is a cross-sectional view taken along line X-X, showing the state right after die casting of the valve assembly according to the embodiment of the present invention.
Figure 2B:
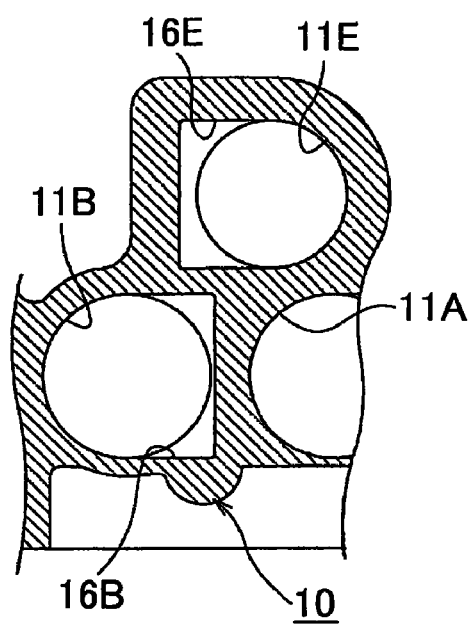
FIG. 2B is a cross-sectional view taken along X-X, showing the state after a diameter-increasing process is performed on the valve assembly according to the embodiment of the present invention.
Figure 2C:
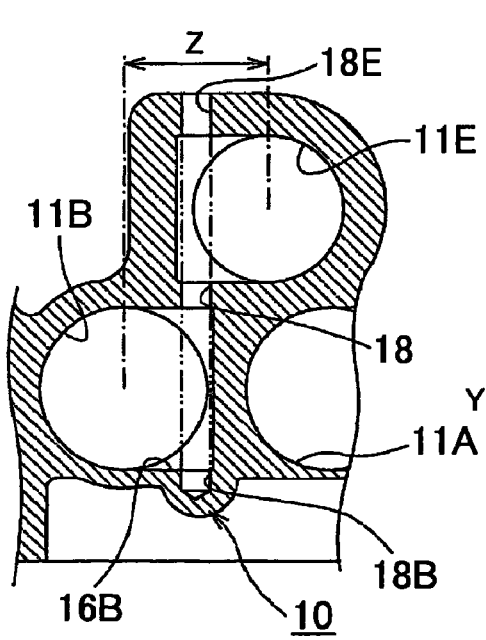
FIG. 2C is a cross-sectional view taken along line X-X, showing the state in which fixing holes are formed in the valve assembly according to the embodiment of the present invention.
Figure 2D:
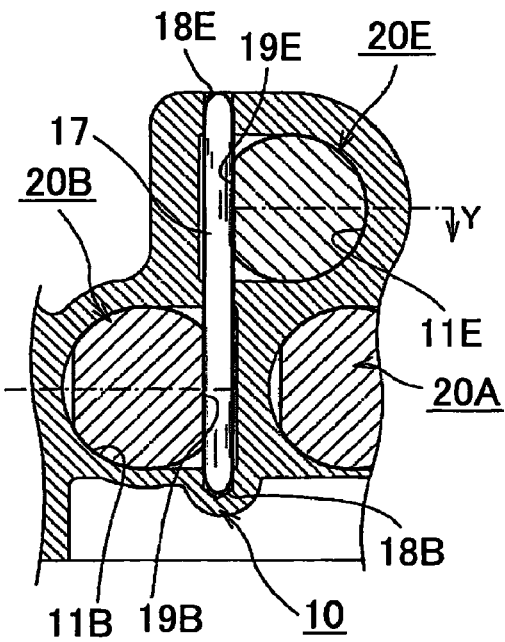
FIG. 2D is a cross-sectional view taken along line X-X, showing the state in which the valve assembly according to the embodiment of the present invention is fixed by an assembly pin.
Figure 5:
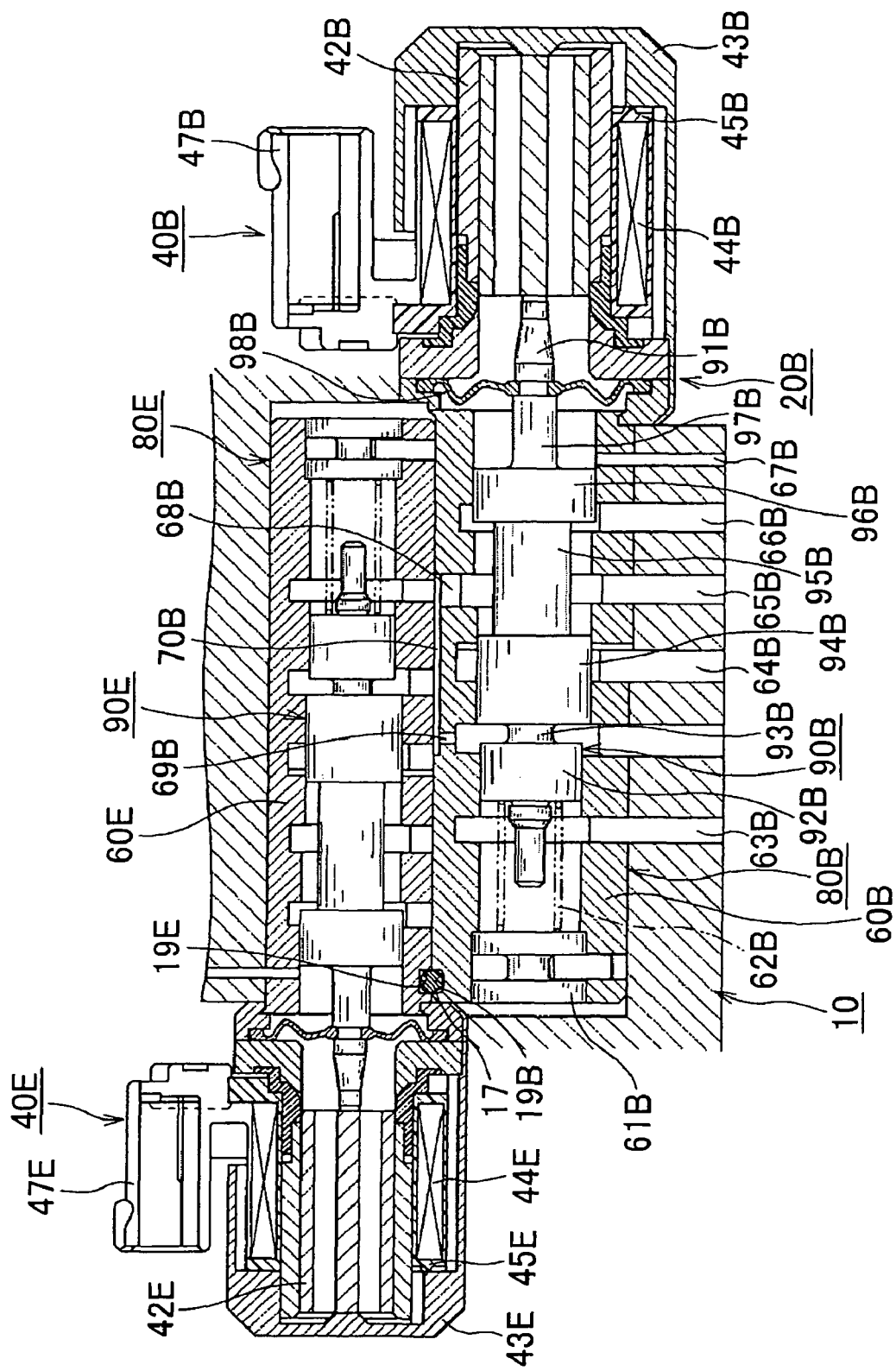
FIG. 5 is a cross-sectional view taken along Y-Y in FIG. 2D, showing the state in which two linear solenoid valves are arranged in the valve assembly according to the embodiment of the present invention.
Figure 6:
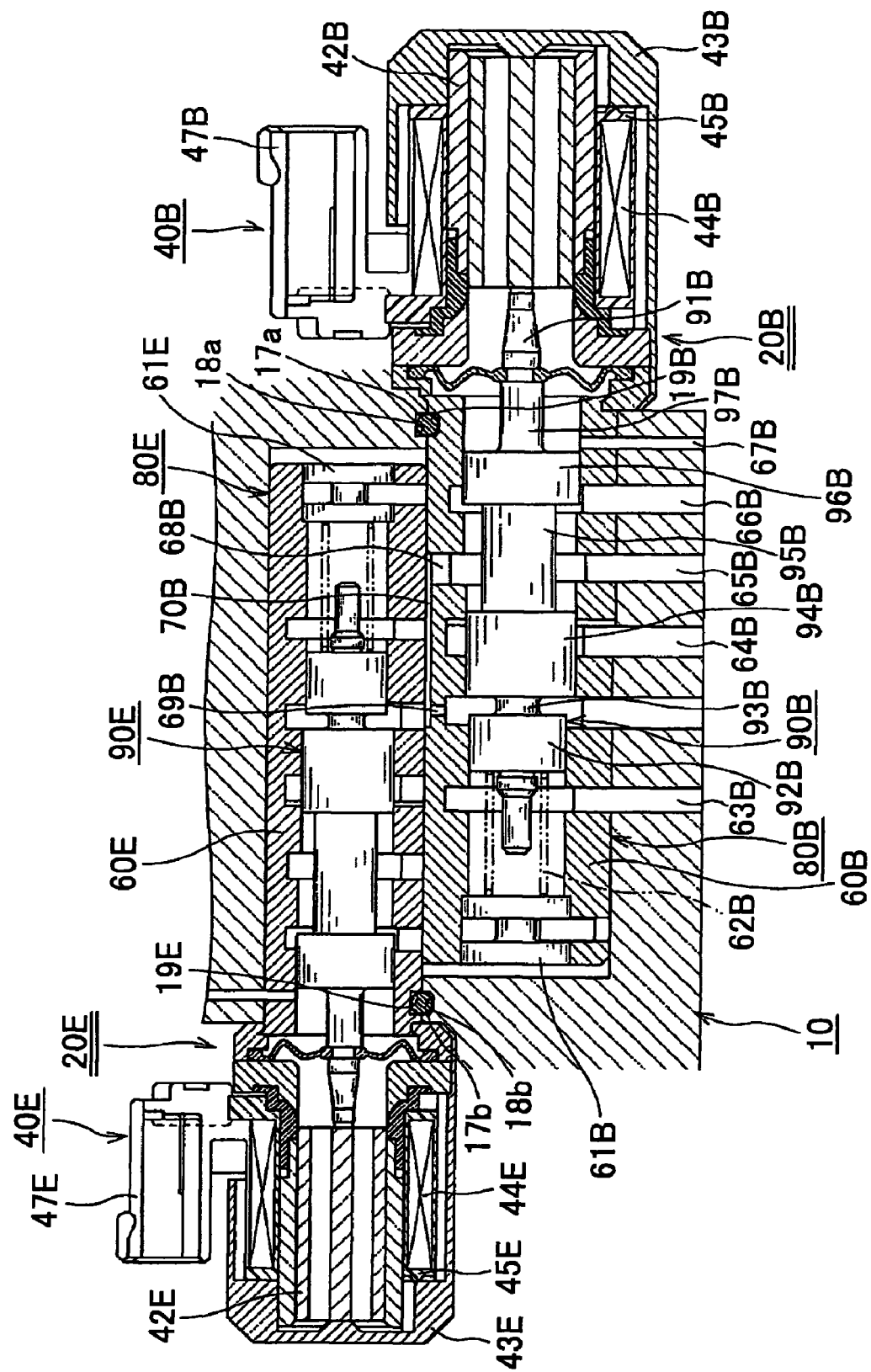
FIG. 6 is a cross-sectional view taken along line Y-Y in FIG. 2D, showing the state in which two linear solenoid valves are arranged in the valve assembly according to the second modified example of the embodiment of the present invention.
Figure 7A:
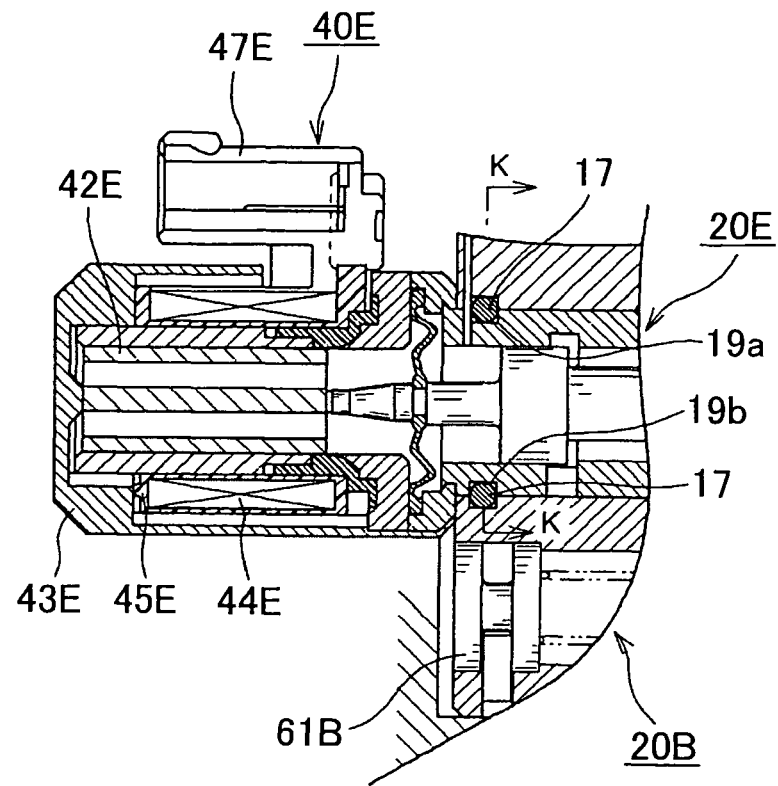
FIG. 7A is a cross-sectional view corresponding to a part of FIG. 5, illustrating formation of two fitting grooves in the valve assembly according to the first modified example of the embodiment of the present invention.
Figure 7B:
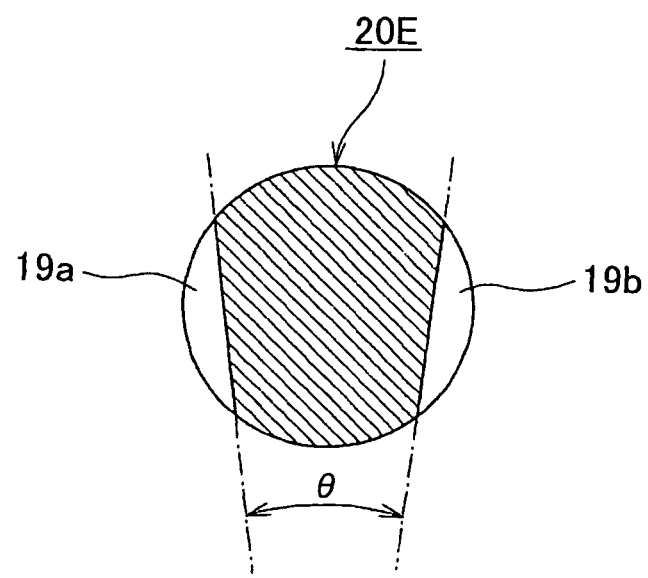
FIG. 7B is a cross-sectional view of a main part taken along line K-K in FIG. 7A.
Figure 8A:
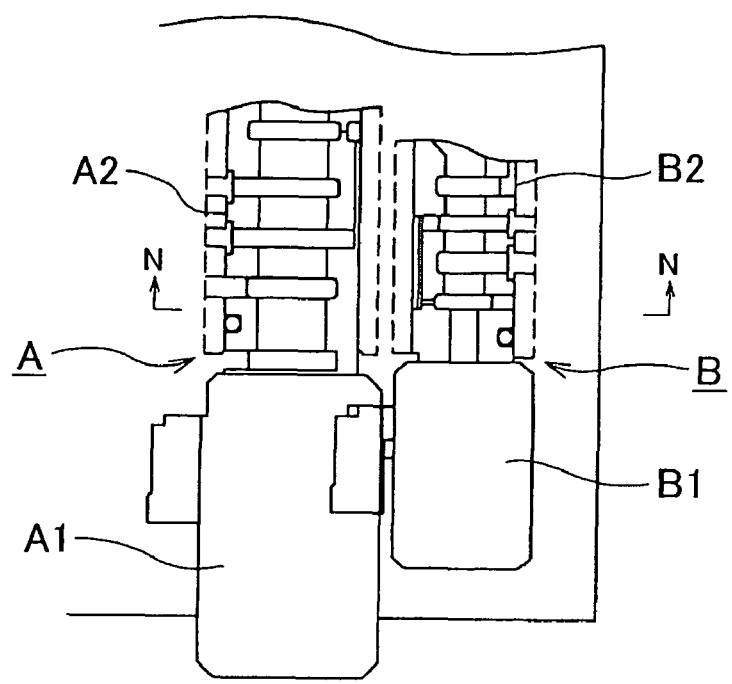
FIG. 8A is a diagram illustrating a simple parallel arrangement of two linear solenoid valves.
Figure 8B:
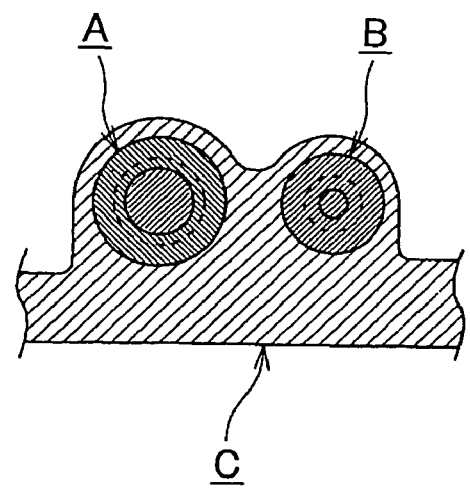
FIG. 8B is a cross-sectional view taken along line N-N, showing pressure-regulating valve portions of the linear solenoid valves shown in FIG. 8A.
Figure 9A:
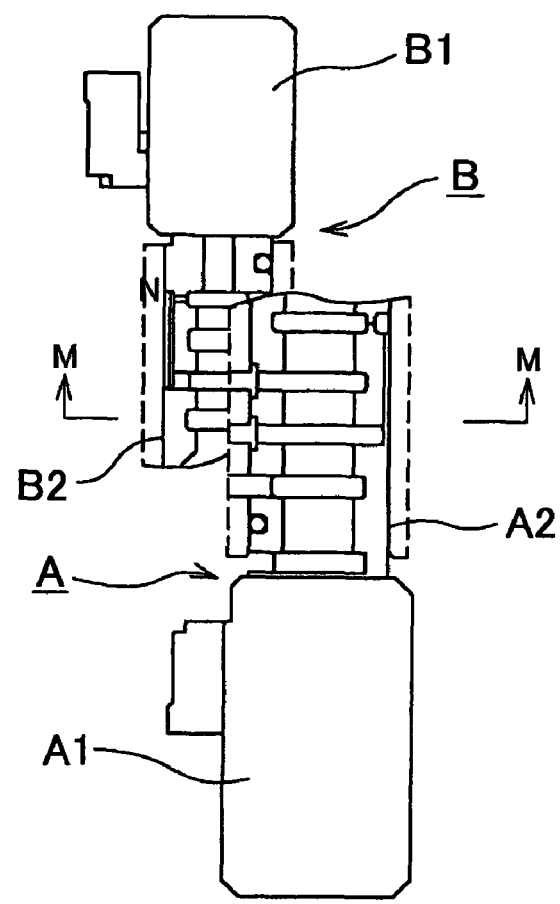
FIG. 9A is a diagram illustrating an efficient arrangement of two linear solenoid valves with a small occupied volume.
Figure 9B:
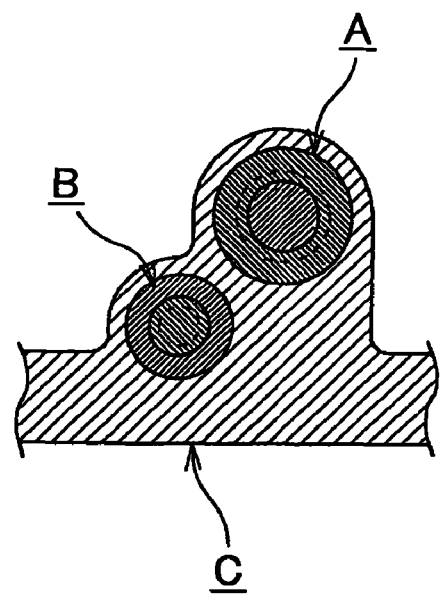
FIG. 9B is cross-sectional view taken along line M-M, showing the pressure-regulating portions of the linear solenoid valves shown in FIG. 9A.

FIG. 1 is a perspective view showing an overall structure of a valve assembly according to an embodiment of the present invention. FIGS. 2A to 2D are cross-sectional views of the valve assembly according to the embodiment of the present invention taken along line X-X. FIGS. 3A to 3D are cross-sectional views corresponding to FIGS. 2A to 2D, showing a valve assembly according to a first modified example of the embodiment of the present invention. FIGS. 4A to 4C are cross-sectional views (where FIG. 4A corresponds to FIG. 2B and FIG. 4B corresponds to FIG. 2C), showing a valve assembly according to a second modified example of the embodiment of the present invention. FIG. 4D is a cross-sectional view at an opposing assembly pin position. FIG. 5 is a cross-sectional view taken along line Y-Y in FIG. 2D, showing an arrangement state of two linear solenoid valves in the valve assembly according to the embodiment of the present invention. FIG. 6 is a cross-sectional view taken along line Y-Y in FIG. 2D, showing an arrangement state of two linear solenoid valves in the valve assembly according to the second modified example of the embodiment of the present invention. FIG. 7A is a cross-sectional view corresponding to a part of FIG. 5, illustrating formation of two fitting grooves in the valve assembly according to the first modified example of the embodiment of the present invention. FIG. 7B is a cross-sectional view showing a main part taken along line K-K in FIG. 7A.

In FIG. 1, a valve body 10 manufactured by aluminum die-casting is a base body to which a plurality of linear solenoid valves 20A, 20B, 20C, . . . (hereinafter, simply referred to as "20" unless a specific linear solenoid valve 20A, 20B, 20C, . . . is mentioned) are mounted and integrally attached. As shown in FIGS. 2A to 2D and FIGS. 3A to 3D, the valve body 10 has a plurality of insertion holes 11A, 11B, 11C, . . . (hereinafter, simply referred to as "11" unless a specific insertion hole 11A, 11B, 11C, . . . is mentioned) to which the plurality of linear solenoid valves 20 are inserted. The insertion holes 11 have ports that are connected to a plurality of valve-side ports in the state where the linear solenoid valves 20 are mounted, and an oil passage formed by connecting the ports can be opened and closed.

The valve body 10 is subjected to a process of preventing slipping out of an assembly pin 17 as described below with reference to FIGS. 2A to 2D. Moreover, a guide plate 12 for guiding lead wires to terminals 47 that serve as connectors of the linear solenoid valves 20 and holding the lead wires is fixed to the valve body 10 by a plurality of bolts 13.

For example, as shown in FIGS. 3A to 3D, each linear solenoid valve 20 provided in a hydraulic circuit of an automatic transmission operates based on a current and supplies an oil pressure corresponding to the current to a not-shown hydraulic servo mechanism provided as an actuator of a frictional engagement element.

Solenoid portions 40B and 40E described below (hereinafter, "B" or "E" shown in the figures is omitted for a common structure of the linear solenoid valves 20B, 20E) are magnetically driving portions. Each pressure-regulating valve portion 80 forms a valve portion that is operated by driving the solenoid portion 40.

First, the structure of the linear solenoid valve 20 formed by the solenoid portion 40 and the pressure-regulating valve portion 80 will be described.

The solenoid portion 40 has a plunger 42 provided so as to be movable with respect to a coil 44, and a terminal 47 for supplying a current to an outer yoke 43 provided so as to surround the coil 44.

The coil 44 formed by winding a wire around a bobbin 45 includes the following portions radially inside of the coil 44 and adjacent to the coil 44: a yoke end portion extending backward from a front end (left end in the figure) of the coil 44; a yoke end portion provided forward (leftward in the figure) of the vicinity of the front end of the coil 44; and a cylindrical magnetic shielding portion formed as a magnetic resistance portion between the yoke end portions. The bobbin 45 around which the coil 44 is wound, both yoke end portions, and the magnetic shielding portion are integrally assembled by welding, brazing, sintering, bonding, or the like.

The solenoid portion 40 has an approximately cylindrical shape except the terminal 47. A hollow portion having the same diameter in an axial direction is axially formed inside the solenoid portion 40, and the plunger 42 is movably inserted into the hollow portion. The outer yoke 43 is a bottomed cylindrical body having a cylindrical portion and a circular bottom portion, and is integrally formed by plastic metal processing such as deep drawing and cold forging. A caulked portion is formed at a front end of the cylindrical portion. An end of a pressure-regulating valve portion 80 is caulked by the outer yoke 43, whereby the solenoid portion 40 and the pressure-regulating valve portion 80 are integrally assembled.

The plunger 42 has the same diameter in the axial direction at its outer peripheral surface, and is longer than the coil 44 in the axial direction. A plunger abutting portion 91 formed at a rear end of a spool 90 of the pressure-regulating valve portion 80 abuts against the center of a front end face (left end face in the figure) of the plunger 42, and an abutting portion formed so as to protrude from the bottom portion of the outer yoke 43 abuts on a rear end face of the plunger 42. Formation of a magnetic path between the plunger 42 and an abutting portion is thus suppressed in the state where the plunger 42 abuts on the outer yoke 43.

The pressure-regulating valve portion 80 has a sleeve 60, the spool 90 movably inserted into the sleeve 60, a retaining end plate 61 attached to a front end of the sleeve 60 for preventing the spool 90 from slipping out of the sleeve 60, and a coil spring 62 provided between the end plate 61 and a front end of the spool 90 and serving as a biasing member for biasing the spool 90 toward the solenoid portion 40 side with a predetermined elastic pressure.

The spool 90 includes a medium-diameter land 92 formed at a front end of the spool 90 and having an accommodating portion for accommodating a rear end of the coil spring 62, a small-diameter groove portion 93, a large-diameter land 94, a small-diameter groove portion 95, a large-diameter land 96, and the plunger abutting portion 91 formed continuously with a small-diameter groove portion 97. In other words, a required number of lands and groove portions are provided in the spool 90.

An annular groove is formed between the groove portion 97 and the plunger-abutting portion 91. An inner peripheral edge of a diaphragm 98 that is an elastic body is attached to the groove, and an outer peripheral edge of the diaphragm 98 is held by an outer periphery on the solenoid portion 40 side. The diaphragm 98 separates the space in the pressure-regulating valve portion 80 from the solenoid portion 40 and prevents iron powder or the like generated in the sleeve 60 from entering the solenoid portion 40.

The sleeve 60 includes an input port 64 for receiving a line pressure regulated by a not-shown primary regulator valve as an input pressure, an output port 65 connected to a hydraulic servo for outputting an output pressure to the hydraulic servo, hermetically sealed feedback ports 68 and 69, a drain port 66 for draining the input pressure, a drain port 63 for draining an oil flowing through a gap between the sleeve 60 and the land 92, and a drain port 67 for draining an oil flowing through a gap between the sleeve 60 and the land 96. The feedback port 68 and the feedback port 69 communicate with the output port 65 through a feedback oil passage 70 formed between the valve body 10 and the sleeve 60. The feedback port 68 and the feedback port 69 receive the output pressure as a feedback pressure, generate a feedback force corresponding to the difference in area between the lands 94 and 96, and biases the spool 90 backward with the feedback force.

Therefore, the spool 90 receives a suction force that is generated by the plunger 42 in response to current supply to the coil 44, a spring load of the coil spring 62, and the feedback force, and advances and retracts integrally with the plunger 42 in a state where the plunger abutting portion 91 abuts on the plunger 42. Note that, in the present embodiment, the plunger-abutting portion 91 abuts on the plunger 42. However, a shaft having a predetermined length may be provided between the plunger 42 and the spool 90. In other words, the solenoid portion 40 has the coil 44 that directly or indirectly drives the spool 90 with an electromagnetic force.

The valve body 10 will now be described.

As shown in FIGS. 2A to 2D, the valve body 10 manufactured by aluminum die-casting has the insertion holes 11 (11B, 11E) into which the plurality of linear solenoid valves 20 are inserted. Each insertion hole 11 is formed with a lightening hole 15 upon manufacturing by die-casting. The lightening hole 15 is smaller in diameter than the insertion hole 11, and an opening end 16 of the insertion hole 11 is located at an opposing face that extends substantially perpendicularly to a direction in which the assembly pin 17 is inserted into a fixing hole 18. The opening end 16 of the insertion hole 11 has a substantially U-shaped cross section formed by lightening into a tunnel (barrel vault) shape. The opening end 16 has a depth equal to the sum of the thickness of the assembly pin 17 and about 1 to 8 mm. This opening end 16 has a shape of a half of an ellipse cut in a length direction. Other than the approximately U-shaped cross section formed by lightening into a tunnel (barrel vault) shape, the opening end 16 may have a shape of an elliptic cylinder, a rectangular parallelepiped, or a cube. In any case, the opening end 16 of the insertion hole 11 of the valve body 10 manufactured by die-casting has a larger diameter than that of the lightening hole 15.

After the valve body 10 is manufactured by die-casting, a process of increasing the diameter of the lightening hole 15 is performed to form the insertion hole 11. In the present embodiment, the insertion hole 11 is normally formed to have the same diameter as a finished diameter of a circular-arc portion of the lightening hole 15. The insertion hole 11 does not necessarily have to match the circular-arc portion of the lightening hole 15. However, if the insertion hole 11 has the same diameter as the diameter of the circular-arc portion of the lightening hole 15, an increased area of the insertion hole 11 closely contacts the linear solenoid valve 20. Therefore, a stable attachment state can be maintained.

After the valve body 10 is manufactured by die-casting, the fixing hole 18 is formed in the opening end 16 of the lightening hole 15. The fixing hole 18 is formed in the insertion direction of the assembly pin 17 on the opening end 16 side of the opposing face having a substantially U-shaped cross section and extending substantially perpendicularly to the insertion direction. The fixing hole 18 may be formed by other than drilling, such as electric discharge machining. However, the structure of the present embodiment is effective for forming a hole by drilling.

Note that, in the opening end 16 of the insertion hole 11 of the valve body 10 on which the linear solenoid valve 20 is mounted, after the assembly pin 17 is inserted into the fixing hole 18, the assembly pin 17 is retained in order to prevent the assembly pin 17 from slipping off. Moreover, the guide plate 12 for guiding lead wires to the terminal 47 of the linear solenoid valve 20 and holding the lead wires is fixed by the plurality of bolts 13.

The opening end 16 located inside the insertion hole 11 on the opposing face extending approximately perpendicularly to the insertion direction of the assembly pin 17 has a depth equal to the sum of the thickness of the assembly pin 17 and about 1 to 8 mm from the end of the opening.

When the opening of the opening end 16 is viewed head-on, the fixing hole 18 of the assembly pin 17 is formed at a position at least 0.5 mm away from a wall surface of the opening end 16. The fixing hole 18 is also formed at such a position that, when the assembly pin 17 is inserted into a fitting groove 19 of the sleeve 60 with the linear solenoid valve 20 mounted therein, the sleeve 60 is pressed to the opposite side to the side of the linear solenoid valve 20 on which the assembly pin 17 is provided, and the sleeve 60 is elastically pressed so as to be able to closely contact a curved surface of the insertion hole 11.

The linear fitting groove 19 is formed on an outer periphery of the sleeve 60. The fitting groove 19 is formed such that a sleeve 60B on the linear solenoid valve 20B side is formed as a fitting groove 19B at an end on the opposite side of the solenoid portion 40, and a sleeve 60E on the linear solenoid valve 20E side is formed as a fitting groove 19E at an end on the solenoid portion 40 side. If the feedback oil passage 70 is formed, this fitting groove 19 is formed on the opposite side to the feedback oil passage 70.

Note that, the fitting groove 19 on the linear solenoid valve 20B side is formed as the fitting groove 19B at the end on the opposite side of the solenoid portion 40, and the fitting groove 19 on the linear solenoid valve 20E side is formed as the fitting groove 19E at the end on the solenoid portion 40 side. Therefore, by forming the fitting groove 19 at the end on the opposite side of the solenoid portion 40 and at the end on the solenoid portion 40 side in the linear solenoid valve 20, there is no need to change the formation position of the fitting groove 19 depending on the position of the insertion hole 11 of the valve body 10. As a result, standardization can be implemented.

In the embodiment shown in FIGS. 2A to 2D, a horizontal distance Z between a central axis of the insertion hole 11B to which the linear solenoid valve 20B is inserted and a central axis of the insertion hole 11E to which the linear solenoid valve 20E is inserted is smaller than the sum of the respective radii of the insertion holes 11B and 11E. This shows that the distance is reduced in the horizontal direction. Typically, the distance Z is preferably at most one third of the radius of the linear solenoid valve 20 according to the empirical rule of the inventors.

In the embodiment shown in FIGS. 2A to 2D, the distance between the central axis of the linear solenoid valve 20B and the central axis of the linear solenoid valve 20E is not reduced in terms of the height. In a first modified example of the embodiment shown in FIGS. 3A to 3D, the insertion hole 11B of the linear solenoid valve 20B and the insertion hole 11E of the linear solenoid valve 20E are located closer to each other to such a position that the insertion holes 11B and 11E contact each other.

Note that, in the embodiment shown in FIGS. 2A to 2D and FIGS. 3A to 3D, the fixing hole 18 is formed in a vertical direction for the insertion hole 11B of the linear solenoid valve 20B and the insertion hole 11E of the linear solenoid valve 20E, and the assembly pin 17 is inserted into the fixing hole 18. When the invention is carried out, the height in the vertical direction can further be reduced by tilting an angle of forming the fixing hole 18 from the vertical direction.

When the valve body 10 is manufactured by die-casting, the opening end 16 is formed at the opening side of the lightening hole 15. When the present invention is carried out, it is not limited to this manufacturing method, and the insertion hole 11 may be formed by a known method.

When the assembly pin 17 is thus mounted in the fitting groove 19 of the sleeve 60 of the linear solenoid valve 20, the assembly pin 17 is inserted into the fitting groove 19B and the fitting groove 19E as well as the fixing hole 18B and the fixing hole 18E. Therefore, a stable attachment state of the linear solenoid valve 20B and the linear solenoid valve 20E can be maintained.

Particularly, when the feedback ports 68 and 69 and the feedback oil passage 70 are formed on a surface on the opposite side to the assembly pin 17, a sealing property can be improved so that an accurate feedback amount from the feedback port 68 to the feedback port 69 and the feedback oil passage 70 can be obtained without leakage. In other words, the assembly pin 17 is located on the opposite side from the feedback oil passage 70. This structure can improve the sealing property between the feedback port 68, the feedback port 69 and the feedback oil passage 70, and the insertion hole 11.

In the linear solenoid valve 20 of the valve assembly of the present embodiment, the fitting groove 19 to which the assembly pin 17 is insertable is formed on the solenoid portion 40 side of the sleeve 60 and on the opposite side to the solenoid portion 40 of the sleeve 60. However, as shown in FIGS. 7A and 7B, it is desirable to form a pair of fitting grooves 19 to which the assembly pin 17 is insertable, both on the solenoid portion 40 side of the sleeve 60 and on the opposite side to the solenoid portion 40 of the sleeve 60.

In other words, the fitting groove 19 to which the assembly pin 17 is inserted is formed in the sleeve 60 of the linear solenoid valve 20 as two fitting grooves 19a and 19b extending at any angle there between except in parallel with each other. The not-shown opposite side to the solenoid portion 40 is formed in the same manner.

The fitting groove 19 to which the assembly pin 17 is inserted is thus formed in the sleeve 60 of the linear solenoid valve 20 as the two fitting grooves 19a and 19b extending at any angle there between except in parallel with each other. When an intersection angle θ between the two fitting grooves 19a and 19b is set to, for example, about 30 degrees, connection with the connector can be easily obtained by pivoting the connection position with the terminal 47. As a result, interference with an adjacent linear solenoid valve 20 can be prevented.

As has been described above, the valve assembly of the present embodiment includes: the linear solenoid valves 20 each having the pressure-regulating valve portion 80 formed by the sleeve 60 having a plurality of valve-side ports and the spool 90 for opening and closing the valve-side ports such as the drain port 63, the input port 64, the output port 65, the drain port 66, the drain port 67, the feedback port 68, and the feedback port 69, and the solenoid portion 40 having the plunger 42 for driving the spool 90 and the coil 44 for electromagnetically driving the plunger 42; and the valve body 10 having the insertion holes 11 for inserting the linear solenoid valves 20 therein and having ports that are connected to the plurality of valve-side ports in the state where the linear solenoid valves 20 are mounted. The linear solenoid valves 20 oppositely inserted into the insertion holes 11 of the valve body 10 and having their respective sleeves 60 located close to each other (adjacent to each other) so that the diameters of the respective solenoid portions 40 at least partially overlap each other in a horizontal and/or vertical direction are fixed to the valve body 10 by the assembly pin 17 that is inserted into the fixing hole 18 formed in the valve body 10.

Therefore, by merely inserting the linear solenoid valve 20 into the insertion hole 11 of the valve body 10 and inserting the assembly pin 17 into the fixing hole 18 formed in the valve body 10, the linear solenoid valve 20 and the valve body 10 can be firmly fixed to each other, and slipping off of the linear solenoid valve 20 can be prevented. Moreover, by removing a single assembly pin 17, a specific linear solenoid valve, for example, the linear solenoid valve 20B or the linear solenoid valve 20E, can be removed without dividing the valve body 10 into a plurality of parts.

Note that the insertion hole 11 of the valve body 10 for inserting the linear solenoid valve 20 therein is formed in the opposing face that extends substantially perpendicularly to the direction in which the assembly pin 17 is inserted into the fixing hole 18. Even when the fixing hole 18 is formed by drilling, the load of the drill teeth does not change depending on the rotation angle. Therefore, a desired fixing hole 18 can be formed and the insertion hole 11 for attaching the linear solenoid valve 20 to the valve body 10, and the fixing hole 18 of the assembly pin 17 for fixing the linear solenoid valve 20 and the valve body 10 to each other can be formed accurately. Moreover, since the load of a drill blade to the rotation angle does not change depending on the rotation angle, the drill can be prevented from being broken or stuck in the valve body 10.

In the embodiment shown in FIG. 1 through FIGS. 3A to 3D, FIG. 5, and FIGS. 7A and 7B, it is described above that the linear solenoid valve 20 of the valve assembly of the embodiment can be standardized by forming in the sleeve 60 the fitting groove 19 to which the assembly pin 17 is inserted as two grooves extending at any angle there between except in parallel with each other. However, the linear solenoid valve 20 can be standardized even if the fitting groove 19 is formed as one groove. This example is shown in FIGS. 4A to 4D and 6.

In FIGS. 4A to 4D and 6, a plurality of linear solenoid valves 20, for example, linear solenoid valves 20B and 20E, are inserted from opposite directions to each other into a plurality of insertion holes 19 formed in the valve body 10 so that the linear solenoid valves 20B and 20E are arranged in parallel with each other. As shown in FIG. 6, a retaining end plate 61B of the linear solenoid valve 20B is displaced from the joint between the solenoid portion 40E and a pressure-regulating valve portion 80E of the other linear solenoid valve 20E by about 5 to 10 mm toward a retaining end plate 61E of the pressure-regulating valve portion 80E.

If the pressure-regulating valve portion 80B and the pressure-regulating valve portion 80E have the same length, the position of the retaining end plate 61E of the linear solenoid valve 20E is displaced from the joint between the solenoid portion 40B and the pressure-regulating valve portion 80B of the other linear solenoid valve 20B by about 5 to 10 mm toward the retaining end plate 61B of the pressure-regulating valve portion 80B.

It should be noted that if the pressure-regulating valve portion 80B and the pressure-regulating valve portion 80E do not have the same length, the retaining end plate 61 having a longer pressure-regulating valve portion 80 can be displaced by about 5 to 10 mm toward the retaining end plate 61 of the other pressure-regulating valve portion 80. In other words, the fixing hole 18B or the fixing hole 18E can be formed directly on the valve body 10 side corresponding to the fitting groove 19B of the linear solenoid valve 20B or the fitting groove 19E of the linear solenoid valve 20E. In a strict sense, the retaining end plate 61 of one linear solenoid valve 20 is displaced toward the retaining end plate 61 of the other linear solenoid valve 20 to such a degree that the assembly pin 17 does not contact the other linear solenoid valve 20 when inserted into the lower linear solenoid valve 20.

In the second modified example of the embodiment shown in FIGS. 4A to 4D, like the embodiment of FIGS. 2A to 2D, the horizontal distance Z between the central axis of the insertion hole 1B to which the linear solenoid valve 20B is inserted and the central axis of the insertion hole 11E to which the linear solenoid valve 20E is inserted is smaller than the sum of the respective radii of the insertion holes 11B and 11E, whereby the distance is reduced in the horizontal direction. In the embodiment of FIGS. 2A to 2D, a single fixing hole 18 is formed in the vertical direction for the insertion hole 11B of the linear solenoid valve 20B and the insertion hole 11E of the linear solenoid valve 20E, and the assembly pin 17 is inserted into the fixing hole 18, whereby the linear solenoid valve 20B and the linear solenoid valve 20E are simultaneously attached by the assembly pin 17. In the embodiment of FIGS. 4A to 4D, on the other hand, two fixing holes 18a and 18b are formed in the vertical direction for the insertion hole 11B of the linear solenoid valve 20B and the insertion hole 11E of the linear solenoid valve 20E, and an assembly pin 17a for attaching only the linear solenoid valve 20B is inserted into the fixing holes 18a and 18b. This assembly pin 17a has about a half-length in order to attach only the linear solenoid valve 20B. However, the assembly pin 17a desirably has a full length in terms of operability.

When the assembly pin 17a is thus mounted in the fitting groove 19B of the sleeve 60B of the linear solenoid valve 20B, the assembly pin 17a is inserted into the fitting groove 19B of the linear solenoid valve 20B and the fixing hole 18a of the valve body 10. Therefore, a stable attachment state of the linear solenoid valve 20B can be maintained. At this time, because a gap is formed between the insertion hole 11E of the linear solenoid valve 20E and the retaining end plate 61, even if the assembly pin 17a having a full length is used, workability may be increased but mechanical problems will not be caused.

A single fixing hole 18b is formed in the vertical direction so as to face the insertion hole 11E of the linear solenoid valve 20E, and an assembly pin 17b for attaching only the linear solenoid valve 20E is inserted into the fixing hole 18b. This assembly pin 17b has about a half-length in order to attach only the linear solenoid valve 20E. However, the assembly pin 17b having a full length can be used by extending the fixing hole 18b to a position facing the insertion hole 11B of the linear solenoid valve 20B.

When the assembly pin 17b is thus mounted in the fitting groove 19E of the sleeve 60E of the linear solenoid valve 20E, the assembly pin 17b is inserted into the fitting groove 19E of the linear solenoid valve 20E and the fixing hole 18b of the valve body 10. Therefore, a stable attachment state of the linear solenoid valve 20E can be maintained.

As has been described above, the valve assembly of the present embodiment includes: the linear solenoid valves 20 each having the pressure-regulating valve portion 80 formed by the sleeve 60 having a plurality of valve-side ports and the spool 90 for opening and closing the valve-side ports such as the drain port 63, the input port 64, the output port 65, the drain port 66, the drain port 67, the feedback port 68, and the feedback port 69, and the solenoid portion 40 having the plunger 42 for driving the spool 90 and the coil 44 for electromagnetically driving the plunger 42; and the valve body 10 having the insertion holes 11 for inserting the linear solenoid valves 20 therein and having ports that are connected to the plurality of valve-side ports in the state where the linear solenoid valves 20 are mounted. Any two linear solenoid valves 20 mounted in the insertion holes 11 of the valve body 10 and having their respective central axes located one above the other, that is, the linear solenoid valves 20B, 20E, are fixed to the valve body 10 by two assembly pins 17a, 17b that are inserted into the fixing holes 18a, 18b formed in the valve body 10.

Therefore, by merely inserting the linear solenoid valve 20 into the insertion hole 11 of the valve body 10 and inserting the assembly pins 17a, 17b into the fixing holes 18a, 18b formed in the valve body 10, the linear solenoid valve 20 and the valve body 10 can be firmly fixed to each other, and slipping off of the linear solenoid valve 20 can be prevented. Moreover, by removing a single assembly pin 17a, 17b, a specific linear solenoid valve, for example, the linear solenoid valve 20B or the linear solenoid valve 20E can be removed without dividing the valve body 10 into a plurality of parts.

Note that the insertion hole 11 of the valve body 10 to which the linear solenoid valve 20 is inserted is formed in the opposing face that extends substantially perpendicularly to the direction in which the assembly pins 17a, 17b are inserted into the fixing holes 18a, 18b. Even when the fixing holes 18a, 18b are formed by drilling, the load of the drill teeth does not change depending on the rotation angle. Desired fixing holes 18a, 18b can therefore be formed, and the insertion hole 11 for attaching the linear solenoid valve 20 to the valve body 10 and the fixing holes 18a, 18b of the assembly pins 17a, 17b for fixing the linear solenoid valve 20 and the valve body 10 to each other can be formed accurately.

The linear solenoid valve 20 is described in the embodiment of FIGS. 1 through 7. When the present invention is carried out, however, the linear solenoid valve 20 can be replaced with a general solenoid valve including an electromagnetic valve.

In other words, the valve assembly of the present embodiment includes: the solenoid portions 40 each having the sleeve 60 having a plurality of valve-side ports, the spool 90 for opening and closing the valve-side ports, and the coil 44 for electromagnetically driving the spool 90; and the valve body 10 having the insertion holes 11 for inserting the solenoid valves therein and having ports that are connected to the plurality of valve-side ports in the state in which the solenoid valves are mounted. The solenoid valves are opposedly inserted into the insertion holes 11 of the valve body 10 such that diameters of the respective solenoid portions at least partially overlap each other in an up-down direction and two of the sleeves 60 located close to each other are fixed to the valve body 10 by the assembly pin 17, 17a or 17b that is inserted into the fixing hole 18 formed in the valve body 10.

Therefore, by merely inserting the solenoid valve into the insertion hole 11 of the valve body 10 and inserting the assembly pin 17 into the fixing hole 18 formed in the valve body 10, the solenoid valve and the valve body can be firmly fixed to each other, and slipping off of the solenoid valve can be prevented.

Moreover, by removing a single assembly pin 17, a specific solenoid valve, for example, can be removed without dividing the valve body 10 into a plurality of parts.

In the valve assembly of the present embodiment, the opening end 16 of the insertion hole 11 of the valve body 10 for mounting the linear solenoid valve 20 thereto is formed in the opposing face extending substantially perpendicularly to the insertion direction of the assembly pin 17 into the fixing hole 18 from the end to a predetermined depth. Therefore, the contact area of the linear solenoid valve 20 in the insertion hole 11 can be maintained. Even if the fixing hole 18 is formed by, for example, drilling in the opposing plane extending substantially perpendicularly to the insertion direction of the assembly pin 17, no external force is applied other than that in the length direction of the drill. Therefore, a straight fixing hole 18 can be accurately formed.

According to the valve assembly of the present embodiment, in the valve body 10 for mounting the linear solenoid valve 20 thereto, the feedback port 68 and the feedback port 69 are formed on one side of the insertion hole 11, and the fitting groove 19 and the fixing hole 18 for the assembly pin 17 are formed on the opposite side to the feedback oil passage 70. Therefore, when the assembly pin 17 is inserted into the fixing hole 18, the linear solenoid valve 20 can be elastically pressed to the insertion hole 11 side of the valve body 10 for mounting the linear solenoid valve 20 thereto. This enables the feedback amount of the feedback port 68, the feedback port 69, and the feedback oil passage 70 to be obtained without leakage, whereby a regulated pressure can be accurately controlled.

Moreover, in the linear solenoid valve 20 of the valve assembly of this embodiment, the fitting groove 19 to which the assembly pin 17 is inserted can be formed in the sleeve 60 as two grooves extending at any angle there between other than in parallel with each other. This structure can be used in the case where the direction in which a specific sleeve 60 is pressed is determined in order to eliminate the leakage from the feedback port 68, the feedback port 69, and the feedback oil passage 70, and the connection position with the terminal 47 as a connector can be corrected. This structure also enables the linear solenoid valves 20 provided in a special arrangement to be easily fixed by the assembly pin 17, and also enables standardization of the linear solenoid valve 20.

In other words, according to the valve assembly of the present embodiment, in the valve body 10 for mounting the linear solenoid valve 20 thereto, the feedback port 68 and the feedback port 69 are formed on one side of the insertion hole 11, and the fixing hole 18 for the assembly pin 17 is formed on the opposite side to the feedback oil passage 70. In order to make the effect of such arrangement significant, it is desirable to provide the feedback port 68 and the feedback port 69 close to the assembly pin 17 on the opposite side to the assembly pin 17.

In other words, when the assembly pin 17 is inserted into the fixing hole 18 and the linear solenoid valve 20 is elastically pressed to the insertion hole 11 side of the valve body 10 for mounting the linear solenoid valve 20 thereto, the linear solenoid valve 20 changes with respect to the retaining end plate 61. Therefore, providing the feedback port 68, the feedback port 69, and the feedback oil passage 70 on the opening end 16 side can improve a sealing property, whereby a regulated pressure can be accurately controlled.

Moreover, in the valve assembly of the present embodiment, a planar displacement between two linear solenoid valves 20 having their respective central axes located one above the other is provided by a distance equal to at most one third of the radius of the linear solenoid valve 20 having a large diameter. Therefore, the depth of the fitting groove 19 that is formed in the sleeve 60 so that the assembly pin 17 is insertable therein can be set to any value, and sufficient mechanical strength can be assured.

In addition, in the valve assembly of the present embodiment, two linear solenoid valves 20 can be assembled by a single assembly pin 17 that is inserted into the fixing hole 18. With this structure, two linear solenoid valves 20 can be removed by merely removing one assembly pin 17 without dividing the valve body 10 into a plurality of parts, whereby workability is improved.

Two linear solenoid valves 20 can be assembled by two or more assembly pins 17 that are inserted into the fixing hole 18. With this structure, the outer shape of the two linear solenoid valves 20 can be standardized.

An example in which the respective diameters of the solenoid portions 40 partially overlap each other in the horizontal direction is described above. When the present invention is carried out, however, it is desirable that the respective diameters of the solenoid portions 40 are set so as to at least partially overlap each other in the horizontal and/or up-down (vertical) direction.

In a valve assembly according to an exemplary aspect of the present invention, a plurality of solenoid valves are mounted in a plurality of insertion holes formed in a valve body. The valve body has valve body-side ports that are connected to the valve-side ports in the state in which the solenoid valves are mounted. Regarding a unit of two solenoid valves of the plurality of solenoid valves, the two solenoid valves are simultaneously fixed to the valve body by an assembly pin that is inserted into a fixing hole formed in the valve body.

The valve body has insertion holes for mounting a part or the whole of a sleeve of the solenoid valve therein, and has ports that are connected to the plurality of valve-side ports in a state in which the solenoid valves are mounted. Each insertion hole may be partially opened or may be formed in a completely closed state except an insertion port of the insertion hole.

The assembly pin fixes the solenoid valve inserted into the insertion hole of the valve body to the valve body. The assembly pin normally has a cylindrical shape. However, the assembly pin may be tapered with a cylindrical shape or may have a prismatic shape.

Fixing to the valve body the two solenoid valves mounted in the insertion holes of the valve body by an assembly pin that is inserted into the fixing hole formed in the valve body means that two solenoid valves mounted in the insertion holes are attached to the valve body by one or more assembly pins.

Moreover, the fixing hole in the valve body may be formed in a vertical direction or may be formed with a predetermined angle.

The solenoid valve corresponds to valves called a linear solenoid valve, an electromagnetic valve, and the like.

Two of the solenoid valves are opposedly inserted into the insertion holes of the valve body such that diameters of the respective solenoid portions at least partially overlap each other in a horizontal and/or up-down direction and the sleeves are located close to each other. By merely inserting the solenoid valve into the insertion hole of the valve body and inserting the assembly pin into the fixing hole formed in the valve body, the solenoid valve and the valve body can be firmly fixed to each other, and slipping off of the solenoid valve can be prevented. Moreover, by removing a single assembly pin, the solenoid valve can be removed without dividing the valve body into a plurality of parts.

In the valve assembly according to an exemplary aspect of the present invention, two of the solenoid valves mounted in the insertion holes of the valve body are fixed to the valve body by a single assembly pin that is inserted into the fixing hole formed in the valve body. The two of the solenoid valves mounted in the insertion holes are thus attached to the valve body by a single assembly pin. In addition, the two of the linear solenoid valves can be removed by merely removing one assembly pin without dividing the valve body into a plurality of parts, whereby workability of assembly and decomposition is improved.

In the valve assembly according to an exemplary aspect of the present invention, two of the solenoid valves mounted in the insertion holes of the valve body are fixed to the valve body by two or more assembly pins that are inserted into the fixing hole formed in the valve body. The two of the solenoid valves mounted in the insertion holes are thus attached to the valve body by two or more assembly pins. In addition, an outside shape of the solenoid valves can be standardized.

In the valve assembly according to an exemplary aspect of the present invention, a fitting groove into which the assembly pin is inserted is formed in the sleeve of the solenoid valve as two grooves extending at any angle there between except in parallel with each other. The two grooves extending at any angle there between except in parallel with each other excludes two grooves extending in parallel with each other, and means that an insertion direction of the assembly pin is different between the two grooves and there is an intersection between the grooves. The solenoid valves are thus provided in a special arrangement that can be easily fixed by the assembly pin, and the connection position with a terminal as a connector can be corrected. Moreover, the solenoid valves can be standardized.

In the valve assembly according to an exemplary aspect of the present invention, two fitting grooves into which the assembly pin is insertable are formed on the solenoid portion side and on an opposite side to the solenoid portion in the sleeve of the solenoid valve. The two fitting grooves into which the assembly pin is insertable and which are formed on the solenoid portion side and on the opposite side to the solenoid portion are used, for example, to determine a surface to which the solenoid valve is pressed by the position of a feedback port. Therefore, a degree of freedom in combining the solenoid valves is increased, whereby standardization can be implemented. Moreover, leakage of a hydraulic fluid can be minimized by selecting the fitting groove to determine the surface to which the solenoid valve is pressed according to the position of the feedback port.

In the valve assembly according to an exemplary aspect of the present invention, an opening end of the insertion hole of the valve body is formed in an opposing face extending substantially perpendicularly to an insertion direction of the assembly pin into the fixing hole from the end to a predetermined depth. The opposing face extending approximately perpendicular to the insertion direction of the fixing pin into the fixing hole serves to prevent a load from varying depending on a rotation angle of drill teeth when the fixing hole is formed in an opposing parallel surface thereof. Therefore, the fixing hole into which the assembly pin is inserted can be easily formed, and workability is improved.

In the valve assembly according to an exemplary aspect of the present invention, a planar displacement between two of the solenoid valves having their respective central axes located one above the other is set to a distance equal to at most one third of a radius of the solenoid valve having a large diameter. The valve assembly in which the planar displacement is set to the distance equal to at most one third of a radius of the solenoid valve having a large diameter excludes, for example, a structure in which two solenoid valves are arranged vertically and a single assembly pin is inserted therein, because this structure does not achieve assembly with a small occupied volume of the valve body. Therefore, the overall volume of the valve assembly can be reduced.

What is claimed is:

1. A valve assembly, comprising:
   a plurality of solenoid valves, each solenoid valve having a pressure-regulating valve portion formed by a sleeve having a plurality of valve-side ports and a spool for opening and closing the valve-side ports, and a solenoid portion having a plunger for driving the spool and a coil for electromagnetically driving the plunger; and
   a valve body having a plurality of insertion holes into which the solenoid valves are inserted, and having ports that are connected to the plurality of valve-side ports in a state in which the solenoid valves are mounted, wherein:
   the solenoid valves are oppositely inserted into the insertion holes of the valve body such that diameters of adjacent solenoid portions at least partially overlap each other in a horizontal or up-down direction and adjacent sleeves are fixed to the valve body by an assembly pin that is inserted into a fixing hole formed in the valve body.

2. The valve assembly according to claim 1, wherein, as the assembly pin that is inserted into the fixing hole, a single assembly pin is used to assemble two of the solenoid valves.

3. The valve assembly according to claim 1, wherein, as the assembly pin that is inserted into the fixing hole, a plurality of assembly pins are used to assemble two of the solenoid valves.

4. The valve assembly according to claim 1, wherein a fitting groove into which the assembly pin is inserted is formed in a sleeve of a solenoid valve of the plurality of solenoid valves as two grooves extending at any angle there between except in parallel with each other.

5. The valve assembly according to claim 1, wherein two fitting grooves into which the assembly pin is insertable are formed on a solenoid portion side and on an opposite side to a solenoid portion in a sleeve of a solenoid valve of the plurality of solenoid valves.

6. The valve assembly according to claim 1, wherein an opening end of an insertion hole of the plurality of insertion holes of the valve body is formed in an opposing face extending substantially perpendicularly to an insertion direction of the assembly pin into the fixing hole from the opening end to a predetermined depth.

7. The valve assembly according to claim 1, wherein a planar displacement between two of the solenoid valves having respective central axes located one above the other is set to a distance equal to at most one third of a radius of a solenoid valve of the two of the solenoid valves having a large diameter.

8. The valve assembly according to claim 1, wherein the insertion holes of the valve body mount a part or an entire sleeve of a solenoid valve of the plurality of solenoid valves therein.

9. The valve assembly according to claim 1, wherein each insertion hole of the plurality of insertion holes is either partially opened or formed in a completely closed state except an insertion port of an insertion hole.

10. The valve assembly according to claim 1, wherein the assembly pin has a cylindrical shape, tapered with a cylindrical shape or a prismatic shape.

11. The valve assembly according to claim 1, wherein the fixing hole in the valve body is formed in a vertical direction or with a predetermined angle.

* * * * *